United States Patent
Roepke et al.

(10) Patent No.: US 11,909,288 B2
(45) Date of Patent: Feb. 20, 2024

(54) STATOR OF AN ELECTRIC MACHINE

(71) Applicant: Robert Bosch GmbH, Stuttgart (DE)

(72) Inventors: Matthias Roepke, Hildesheim (DE); Jens Sauermann, Berlin (DE); Juergen Kujath, Elze (DE)

(73) Assignee: Robert Bosch GmbH, Stuttgart (DE)

(*) Notice: Subject to any disclaimer, the term of this patent is extended or adjusted under 35 U.S.C. 154(b) by 370 days.

(21) Appl. No.: 17/607,148

(22) PCT Filed: Apr. 2, 2020

(86) PCT No.: PCT/EP2020/059344
§ 371 (c)(1),
(2) Date: Oct. 28, 2021

(87) PCT Pub. No.: WO2020/221545
PCT Pub. Date: Nov. 5, 2020

(65) Prior Publication Data
US 2022/0181942 A1 Jun. 9, 2022

(30) Foreign Application Priority Data

Apr. 29, 2019 (DE) .................. 10 2019 206 107

(51) Int. Cl.
| | | |
|---|---|---|
| *H02K 3/52* | (2006.01) | |
| *H02K 3/02* | (2006.01) | |
| *H02K 3/32* | (2006.01) | |

(52) U.S. Cl.
CPC .............. *H02K 3/522* (2013.01); *H02K 3/02* (2013.01); *H02K 3/325* (2013.01); *H02K 2203/06* (2013.01); *H02K 2203/09* (2013.01)

(58) Field of Classification Search
CPC .......... H02K 3/02; H02K 3/325; H02K 3/522; H02K 2203/06; H02K 2203/09
See application file for complete search history.

(56) References Cited

U.S. PATENT DOCUMENTS

| | | | |
|---|---|---|---|
| 6,276,946 B1 * | 8/2001 | Stephan ................. | H01R 13/08 439/876 |
| 2005/0023910 A1 | 2/2005 | Lukenich | |

(Continued)

FOREIGN PATENT DOCUMENTS

| | | | |
|---|---|---|---|
| WO | 2015083623 A1 | 6/2015 | |
| WO | 2019023379 A1 | 1/2019 | |
| WO | WO-2019083036 A1 * | 5/2019 | ........... C01B 32/158 |

OTHER PUBLICATIONS

Translation of International Search Report for Application No. PCT/EP2020/059344 dated Jun. 22, 2020 (2 pages).

*Primary Examiner* — Jeremy A Luks
(74) *Attorney, Agent, or Firm* — Michael Best & Friedrich LLP

(57) ABSTRACT

A stator of an electric machine is already known, comprising stator teeth and grooves formed between the stator teeth, in which electrical conductor elements of an electrical individual coil winding are provided as individual coils, wherein an interconnection is provided on at least one end side of the stator, which has a ring section and multiple, in particular a number corresponding to the number of stator teeth, tooth sections protruding from the ring section in the radial direction. The interconnection ring comprises multiple bus bars for interconnecting the electrical individual coils of the electrical winding. The individual coils are produced from a conventional conductor material, e.g. copper. In the stator according to the invention, an electrical winding made of CNT conductor elements is provided. According to the invention: the conductor elements (4) of the electrical winding are configured as insertable conductor elements (4) of the electrical winding designed as a plug-in winding; the conductor elements (4) are each formed of a combination of carbon nanotubes and/or graphene fibres; and at least one electrically non-conductive conductor joining device (12) is (Continued)

provided on at least one of the tooth sections (10) of the interconnection ring (5), to which two respective conductor ends of two different conductor elements (4) are electrically connected by means of an electrically conductive joining means.

14 Claims, 7 Drawing Sheets

(56) References Cited

U.S. PATENT DOCUMENTS

| | | |
|---|---|---|
| 2019/0013713 A1 | 1/2019 | Wang et al. |
| 2019/0229586 A1* | 7/2019 | Hopkins .................. H02K 9/06 |
| 2023/0283137 A1* | 9/2023 | Takahashi .............. H02K 3/522 |
| | | 310/208 |

* cited by examiner

STATOR OF AN ELECTRIC MACHINE

BACKGROUND

The invention relates to a stator of an electric machine.

A stator of an electric machine is already known from US 2005/0023910 A1, said stator having stator teeth and embodied between the stator teeth are grooves in which are provided in each case electrical conductor elements of an electrical individual coil winding, said electrical conductor elements being embodied as individual coils, wherein an interconnecting ring is provided on at least one end face of the stator and said interconnecting ring has an annular section and multiple toothed sections that in particular correspond to the number of the stator teeth and protrude from the annular section in the radial direction. The interconnecting ring comprises multiple current rails for interconnecting the electrical individual coils of the electrical winding. The individual coils are produced from a conventional conductor material, in particular copper.

Furthermore, electric machines are known whose electrical winding is produced from CNT conductor elements. These CNT conductor elements are to be understood below to mean conductor elements that comprise carbon nanotube fibers and/or graphene fibers. According to the current status, it is not technically possible to use conventional joining methods, such as for example, welding or soldering, to connect CNT conductor elements or to electrically connect the CNT conductor elements to interfaces of the stator, the reason for this is that the technical requirements placed on the joining connection with respect to temperature resistance and strength are not fulfilled.

SUMMARY

The inventive stator of an electric machine has in contrast thereto the advantage that an electric winding is produced from CNT conductor elements and the joining connections thereof fulfill the mechanical and electrical requirements of an electric machine in a reliable manner. This is facilitated in accordance with the invention in that the conductor elements of the electric winding are embodied as pluggable conductor elements of the electrical winding that is embodied as a plug-in winding, in that the conductor elements are embodied in each case as CNT conductor elements, in other words are formed in each case from a composite of carbon nanotubes and/or graphene fibers, and in that at least one electrically non-conductive conductor joining device is provided on at least one of the toothed sections of the interconnecting ring and in each case two conductor ends of two different conductor elements are electrically connected to said conductor joining device by means of an electrically conductive joining agent.

It is particularly advantageous if the conductor joining device comprises in each case a depression. The conductor ends of the conductor elements can be placed in this depression and then are electrically connected by means of an electrically conductive joining agent.

Furthermore, it is advantageous if in each case the conductor joining devices are provided with two insertion slits by way of which the conductor ends can be placed in the depression. In this manner, the procedure of placing the conductor ends into the conductor joining device is simplified and improved.

It is very advantageous if the conductor joining devices are part of an electrically non-conductive insulating body of the interconnecting ring. In this manner, the conductor joining device is embodied in an electrically non-conductive manner and is consequently electrically insulated with respect to conductor rails that can be integrated in the interconnecting ring.

According to one advantageous exemplary embodiment, it is provided to interconnect the pluggable conductor elements of the plug-in winding by way of the conductor joining devices of the interconnecting rings to the individual toothed coils that extend in each case with multiple windings around one of the stator teeth.

It is also advantageous if the interconnecting ring is provided at both end faces of the stator, wherein multiple current rails are arranged in the insulating body of the one interconnecting ring so as to electrically interconnect the conductor elements and wherein the insulating body of the other interconnecting ring is embodied in a current rail-free manner. By providing the interconnecting rail at both end faces of the stator, the conductor elements can be interconnected at both end faces of the stator to an electrical winding.

According to one advantageous exemplary embodiment, it is provided to interconnect the pluggable conductor elements of the plug-in winding by way of the conductor joining devices of the interconnecting rings to individual toothed coils that extend in each case with multiple windings about one of the stator teeth, wherein the individual toothed coils are connected in each case to a coil end on one of the current rails of the one interconnecting ring and in each case to the other coil end at another one of the current rails of the same interconnecting ring.

Furthermore, it is advantageous if the current rails of the one interconnecting ring have in each case electrical connectors so as to connect the conductor elements, wherein the electrical connectors each have a depression or are provided in a depression of the insulating body of the interconnecting ring, wherein the depression is embodied so as to receive an electrically conductive joining agent and at least one conductor end of one of the conductor elements. In this manner, the conductor elements are electrically connected in a reliable manner to one of the interfaces of the stator, and in fact in a corresponding manner to the joining connection between two conductor elements on the conductor joining device.

It is advantageous if one or more of the current rails of the one interconnecting ring has/have cantilever sections that each reach into one of the toothed sections of the insulating body of the interconnecting ring. In this manner, it is possible in each case to electrically connect a coil end of one of the individual toothed coils to the respective cantilever section of one of the current rails with the result that a simple electrical interconnection is achieved.

Furthermore, it is advantageous that the electrical connectors of the current rails are accessible by way of an opening in the insulating body of the interconnecting ring or protrude out of the insulating body. In this manner, the conductor elements can be connected to the current rails of the interconnecting ring.

It is further advantageous that the joining agent is an electrically conductive adhesive, a soldering agent or a welding filler material.

BRIEF DESCRIPTION OF THE DRAWINGS

An exemplary embodiment of the invention is illustrated in a simplified manner in the drawing and further explained in the description below.

DETAILED DESCRIPTION

Figure 1:
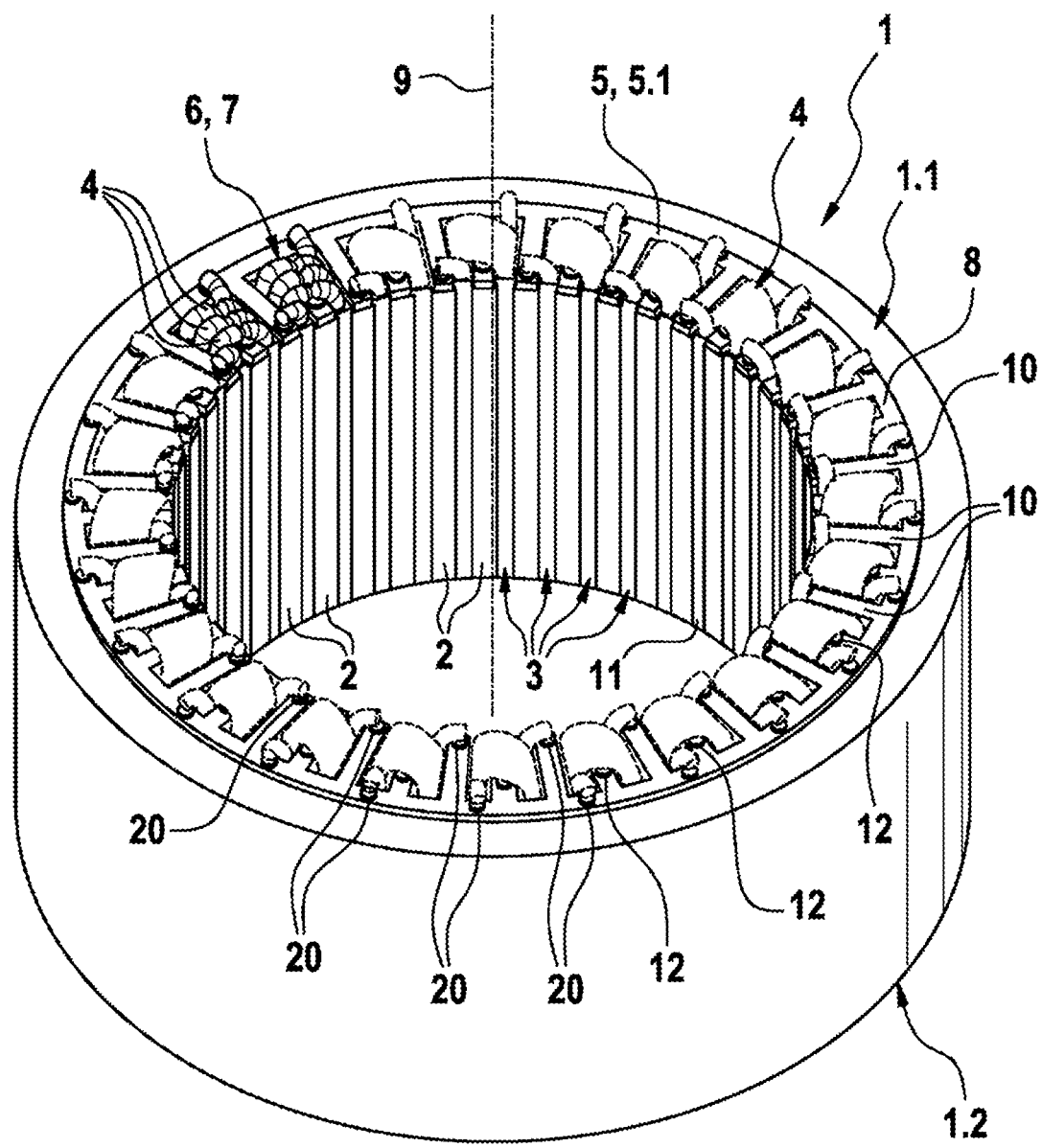
FIG. 1 illustrates a three dimensional view of a first end face of an inventive stator of an electric machine having CNT conductor elements and having a first interconnecting ring in accordance with the invention so as to electrically interconnect the conductor elements.

FIG. 1 illustrates a three dimensional view of a first end face of an inventive stator of an electric machine having CNT conductor elements and having a first interconnecting ring in accordance with the invention so as to electrically interconnect the conductor elements.

The stator 1 of the electric machine comprises a stator body having stator teeth 2 and embodied between the stator teeth 2 grooves 3 in which in each case electrical conductor elements 4 are provided so as to form an electrical winding 6. According to the exemplary embodiment, four conductor elements 4 per groove 3 are provided in the grooves 3. The number of conductor elements 4 per groove 3 is however specifically arbitrary.

The stator body has for example at least one laminated core.

In each case, an interconnecting ring 5 is provided at both end faces 1.1, 1.2 of the stator 1, said interconnecting ring having an annular section 8 and multiple toothed sections 10 that protrude from the annular section 8 in the radial direction with respect to a stator axis 9.

It is provided in accordance with the invention that the conductor elements 4 of the electrical winding are embodied as pluggable conductor elements of an electrical winding that is embodied as a plug-in winding, that the conductor elements 4 are each formed from a composite of carbon nanotubes and/or graphene fibers and that an electrically non-conductive conductor joining device 12 is provided on at least one of the toothed sections 10 of one of the interconnecting rings 5 and in each case two conductor ends of two different conductor elements 4 are electrically connected to said conductor joining device by means of an electrically conductor joining agent. The joining connection that is produced thereby is identified in FIG. 2 and FIG. 3 by the reference numeral 13.

The joining agent can be for example an electrically conductive adhesive, a soldering agent or a welding filler material.

The conductor joining devices 12 of the interconnecting ring 5 make available in each case a joining area so as to join the conductor ends of the relevant conductor elements 4, in order in this manner to connect the conductor elements 4 to a functioning electrical winding. According to the exemplary embodiment, the pluggable conductor elements 4 of the plug-in winding are connected or interconnected to the conductor joining devices 12 of the interconnecting ring 5 to individual toothed coils 7. The individual toothed coils 7 that are formed in this manner extend in each case with multiple windings about one of the stator teeth 2.

Figure 2:
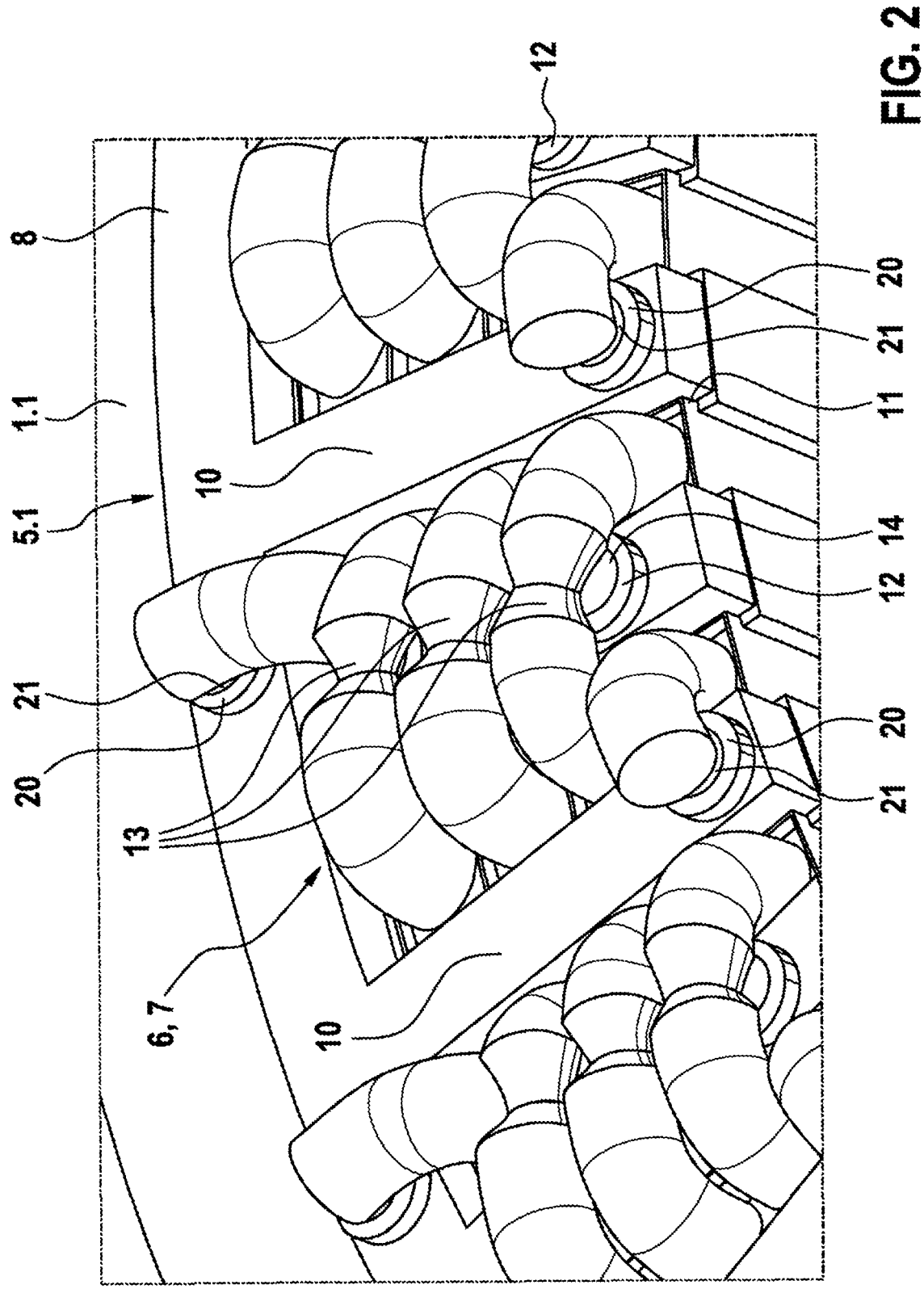
FIG. 2 illustrates a part view of the stator shown in FIG. 1.

FIG. 2 illustrates a part view of the stator shown in FIG. 1.

The pluggable conductor elements 4 are for example embodied in each case in such an I-shaped or rod-shaped manner that they have in each case a single conductor limb that is lying in one of the grooves 3, said single conductor limb protruding in each case out of the respective groove 3 with bent conductor ends that lie in different winding heads. The pluggable conductor elements 4 can have an arbitrary, for example rectangular, trapezoidal, circular or oval cross-section. The individual carbon nanotubes and/or graphene fibers of one of the conductor elements 4 can be connected by an electrically insulating or electrical conductive composite material, in particular resin or adhesive, to which the composite that forms the corresponding conductor element 4 is connected. The pluggable conductor elements 4 can be encompassed in the region of the grooves 3 in each case by an electrical insulation 11, for example a so-called groove insulation paper.

The conductor joining device 12 can comprise in each case a depression 14 on the toothed sections 10 of one of the interconnecting rings 5 and the conductor ends of two conductor elements 4 can be placed in said depression in order to join them to the electrically conductive joining agent. For example, the conductor ends of two conductor elements 4 are placed in one of the depressions 14 in order to subsequently apply the electrically conductive joining agent to the two conductor ends so as to connect them.

Figure 3:
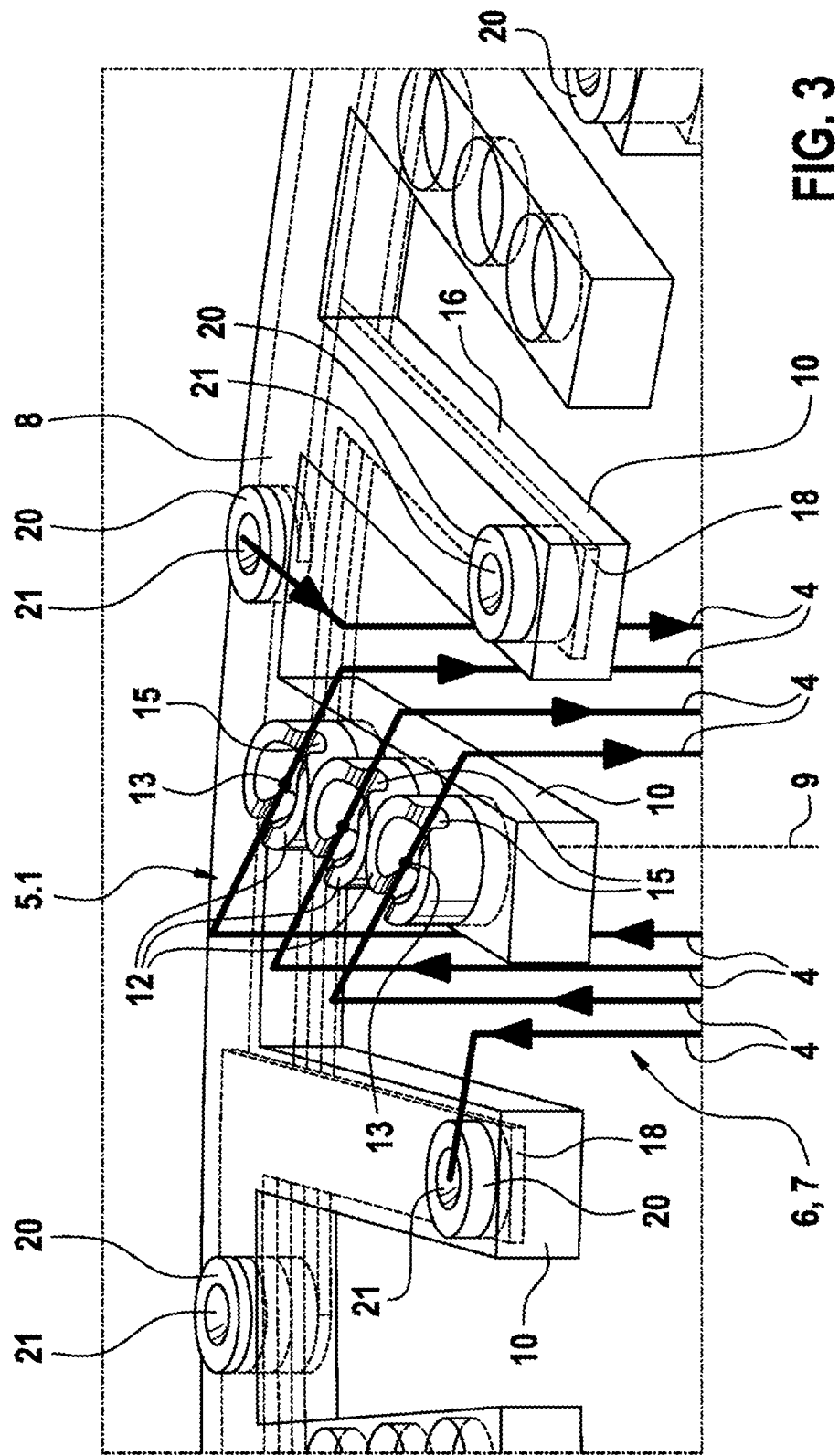
FIG. 3 illustrates a part view of the interconnecting ring in accordance with the invention shown in FIG. 1 and FIG. 2.

FIG. 3 illustrates a part view of the interconnecting ring in accordance with the invention shown in FIG. 1 and FIG. 2. In FIG. 3, the conductor elements 4 are only illustrated for the schematic view as a solid line.

According to the exemplary embodiment, it is possible to provide on the depressed conductor joining devices 12 in each case two insertion slits or openings 15 by way of which the conductor ends of the relevant conductor elements 4 can be placed in the depression 14.

The conductor joining devices 12 can be part of an electrical non-conductive insulating body 16 of the interconnecting rings 5, in other words therefore embodied as one piece on the insulating body 16. The insulating body 16 of the interconnecting ring 5 represents the base body that shapes the contour of the interconnecting ring 5 and is produced for example from a synthetic material.

The interconnecting ring 5 having the conductor joining devices 12 in accordance with the invention is provided at both end faces 1.1, 1.2 of the stator 1. In addition, multiple current rails 18 are arranged in the insulating body 16 of the one, i.e. first, interconnecting ring 5.1 so as to electrical interconnect the conductor elements 4 or the individual toothed coils 7. The current rails 18 are assigned to an electrical phase or an electrical star point. The conductor joining devices 12 are electrically insulated by the material of the insulating body 16 with respect to the current rails 18. In contrast, the insulating body 16 of the other, i.e. second, interconnecting ring 5.2 does not have any current rails 18 and is consequently embodied in a current rail-free manner.

As is apparent in FIG. 2 and FIG. 3, the individual toothed coils 7 are connected in each case by a coil end to one of the current rails 18 of the first interconnecting ring 5.1 and in each case by the other coil end to another of the current rails 18 of the same interconnecting ring 5.1.

The current rails 18 of the first interconnecting ring 5 have so as to connect the conductor elements 4 or the individual toothed coils 7 in each case electrical connectors 20. The electrical connectors 20 of the first interconnecting rings 5 can in each case comprise a depression 21 or can be embodied in a depression 21 of the insulating body 16 of the first interconnecting ring 5.1. The depression 21 of the connectors 20 is embodied so as to receive an electrically conductive joining agent and at least one conductor end of one of the conductor elements 4. The depression 21 can have an insertion slit 15 or an insertion opening 15 equivalent to the depressions 14 so as to facilitate the procedure of placing the respective conductor end in said depression.

The number of toothed sections 10 of the first interconnecting ring 5.1 corresponds to the number of stator teeth 2 of the stator 1. According to the exemplary embodiment, multiple conductor joining devices 12 are provided on each second toothed section 10 of the first interconnecting ring 5 on the end face remote from the stator 1. The number of conductor joining devices 12 per each second toothed section 10 corresponds for example to the number of conductor elements 4 per groove 3 minus one.

One or more of the current rails 18 of the first interconnecting ring 5.1 can have cantilever sections 22 that each reach into one of the toothed sections 10 of the insulating body of the interconnecting ring 5.1. According to the exemplary embodiment, only one of the current rails 18, which is assigned to the electrical star point, has the cantilever sections 22. One of the two coil ends of each individual toothed coil 7 is connected in each case to a connector 20 that is embodied on one of the toothed sections 10 of the first interconnecting ring 5.1 and is assigned to a current rail 18 that forms the electrical star point. The other of the two coil ends of the same individual toothed coil 7 is connected in each case to a connector 20 of another current rail 18, said connector being provided on the annular section 8 of the first interconnecting ring 5.1 and is assigned to one of the electrical phases. The electrical connectors 20 of the current rails 18 are in each case accessible by way of a breakthrough or an opening in the insulating body 16 of the first interconnecting ring 5.1 so as to connect the conductor elements 4 or the electrical connectors 20 stand proud beyond the breakthrough or the opening in the insulating body 16 out of the insulating body 16 or protrude therefrom.

According to the exemplary embodiment, each second toothed section 10 of the first interconnecting ring 5.1 is provided with a cantilever section 22 of the current rail 18 that is assigned to the electrical star point, wherein the toothed sections 10 having the conductor joining devices 12 and the toothed sections 10 having the cantilever sections 22 are offset with respect to one another by a toothed section 10. Therefore, according to the exemplary embodiment, there are no toothed sections 10 that comprise conductor joining devices 12 and cantilever sections 22.

Figure 4:
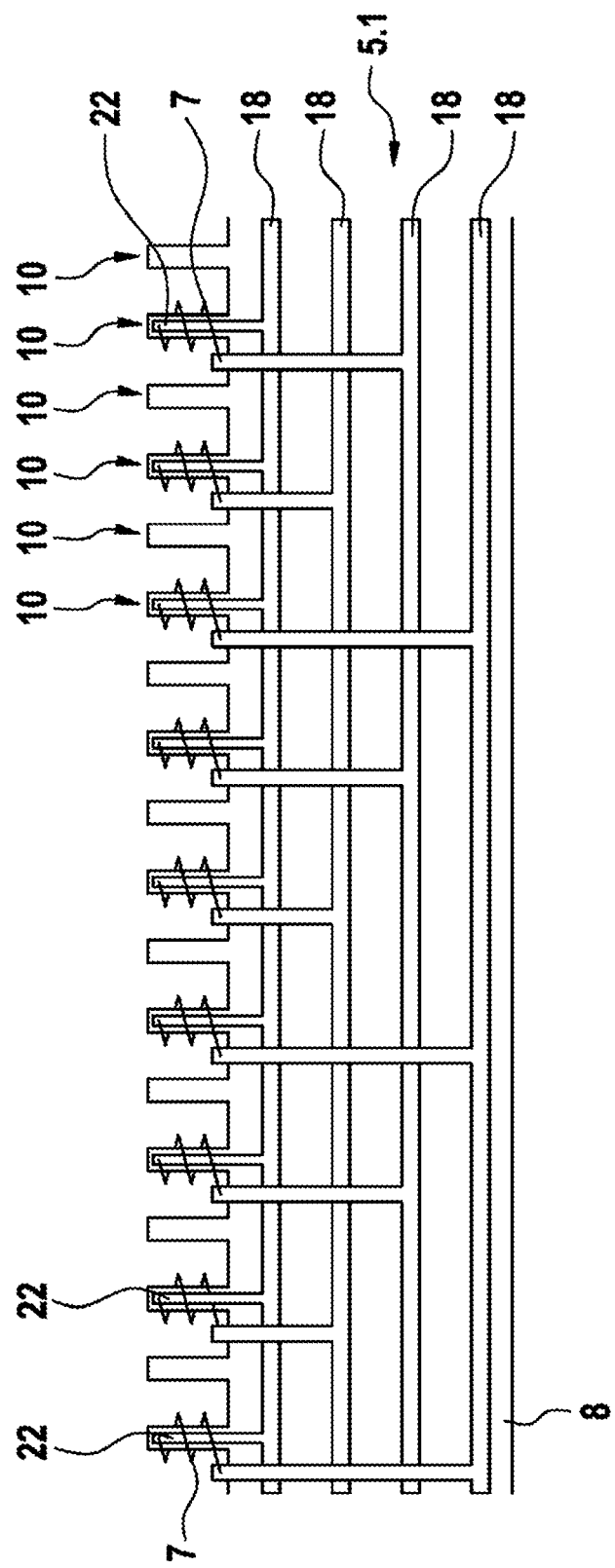
FIG. 4 illustrates a circuit diagram for the interconnecting ring in accordance with the invention shown in FIG. 1 to FIG. 3.

FIG. 4 illustrates for example a circuit diagram for the interconnecting ring in accordance with the invention shown in FIG. 1 to FIG. 3 having four current rails. It is apparent from FIG. 4 for example how the individual toothed coils 7 can be connected to the current rails 18.

Figure 5:
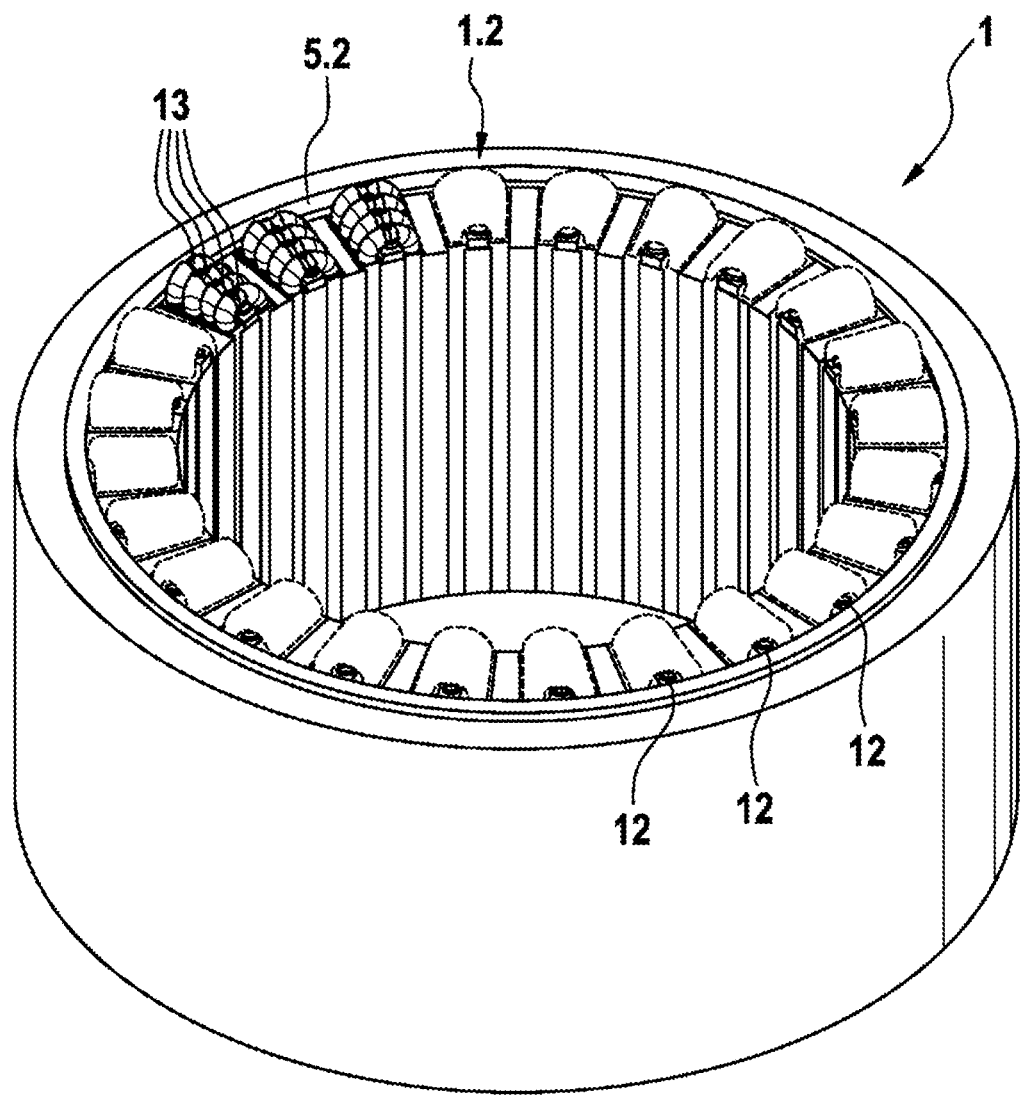
FIG. 5 illustrates a three dimensional view of a second end face of the stator in accordance with the invention shown in FIG. 1 having a second interconnecting ring in accordance with the invention.

FIG. 5 illustrates a three dimensional view of a second end face of the stator in accordance with the invention shown in FIG. 1 having a second interconnecting ring in accordance with the invention.

The second interconnecting ring 5.2 shown in FIG. 2 differs with respect to the first interconnecting ring 5 shown in FIG. 1 only in that it does not have any current rails 18 and does not have any connectors 20 for the current rails 18. Furthermore, the second interconnecting ring 5.2 does not have any toothed sections 10 that in the first interconnecting ring 5.1 comprise a cantilever section 22 of a current rail 18. As a consequence, for the second interconnecting ring 5.2 there are a number of toothed sections 10 that corresponds to half the number of stator teeth 2 of the stator 1. In other words, the second interconnecting ring 5.2 only has a toothed section 10 on each second stator tooth 2. Otherwise, the second interconnecting ring 5.2 is embodied in the same manner as the first interconnecting ring 5.1, therefore also comprising the insulating body 16 having the inventive conductor joining devices 12 on the toothed sections 10. In contrast to the first interconnecting ring 5.1, the second interconnecting ring 5.2 has conductor joining devices 12 on each toothed section 10, wherein the number of conductor joining devices 12 per toothed section 10 is provided corresponding to the first interconnecting ring 5.1.

Figure 6:
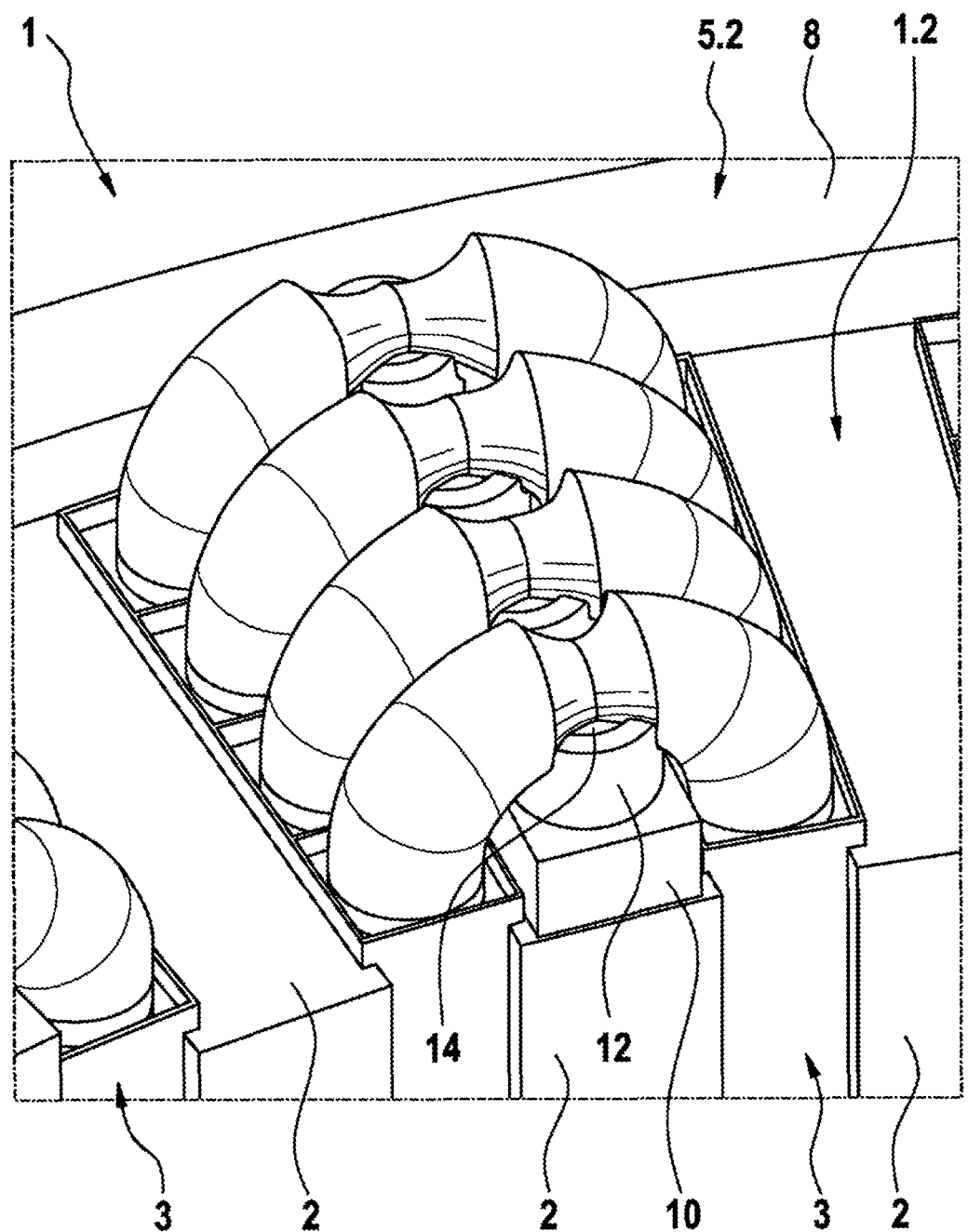
FIG. 6 illustrates a part view of the second end face of the stator shown in FIG. 5

FIG. 6 illustrates a part view of the second end face 1.2 of the stator 1 shown in FIG. 5.

Figure 7:
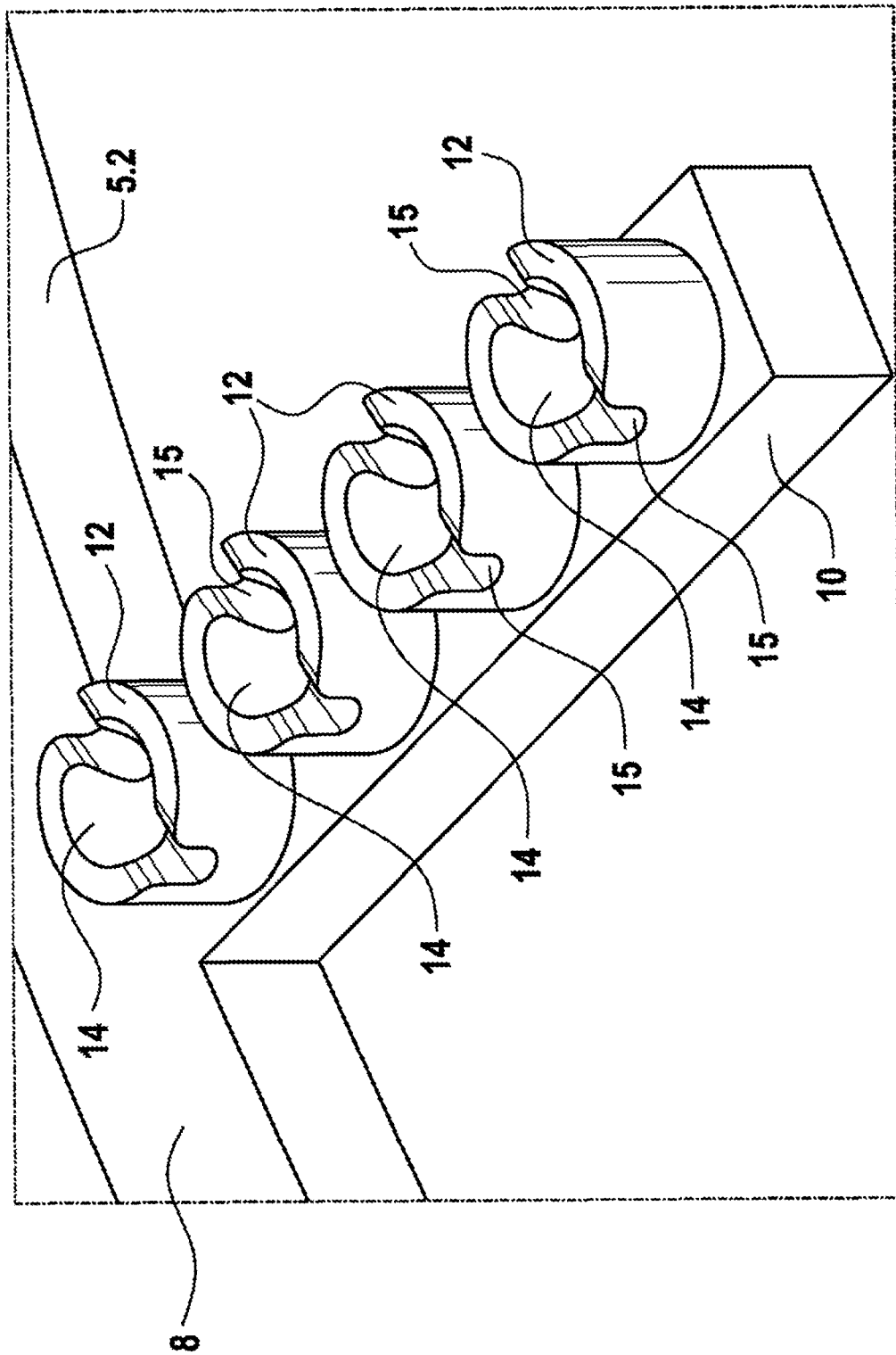
FIG. 7 illustrates a part view of the second interconnecting ring shown in FIG. 5 and FIG. 6.

FIG. 7 illustrates a part view of the second interconnecting ring shown in FIG. 5 and FIG. 6. The conductor elements 4 are not illustrated in FIG. 7 with the result that the depressions 14 of the conductor joining devices 12 are easily apparent.

The invention claimed is:

1. A stator of an electric machine that has stator teeth (2) and embodied between the stator teeth (2) are grooves (3) in which are provided in each case electrical conductor elements (4) of an electrical coil winding, wherein an interconnecting ring (5, 5.1, 5.2) is provided on at least one end face (1.1, 1.2) of the stator (1), said interconnecting ring comprising an annular section (8) and multiple toothed sections (10) that protrude from the annular section (8) in the radial direction with respect to a stator axis (9), wherein
   the conductor elements (4) of the electrical winding are embodied as pluggable conductor elements (4) of the electrical winding that is embodied as a plug-in winding, that
   the conductor elements (4) are formed in each case from a composite of carbon nanotubes and/or graphene fibers, that
   at least one electrically non-conductive conductor joining device (12) is provided on at least one of the toothed sections (10) of the interconnecting ring (5) and in each case two conductor ends of two different conductor elements (4) are electrically connected to said conductor joining device by an electrically conductive joining agent.

2. The stator as claimed in claim 1, wherein the conductor joining device (12) comprises in each case a depression (14).

3. The stator as claimed in claim 1, wherein the conductor joining devices (12) are part of an electrically non-conductive insulating body (16) of the interconnecting ring (5).

4. The stator as claimed in claim 1, wherein the pluggable conductor elements (4) of the plug-in winding are connected by way of the conductor joining devices (12) of the interconnecting rings (5) to individual toothed coils (7) that in each case extend with multiple windings about one of the stator teeth (2).

5. The stator as claimed in claim 3, wherein the interconnecting ring (5) is provided at both end faces (1.1,1.2) of the stator (1), wherein multiple current rails (18) are arranged in the insulating body (16) of the one interconnecting ring (5.1) so as to electrically interconnect the conductor elements (4) and wherein the insulating body (16) of the other interconnecting ring (5.2) is embodied in a current rail-free manner.

6. The stator as claimed in claim 5, wherein the individual toothed coils (7) are connected in each case by a coil end to one of the current rails (18) of the one interconnecting ring (5.1) and in each case by the other coil end to another of the current rails (18) of the same interconnecting ring (5.1).

7. The stator as claimed in claim 5, wherein the current rails (18) of the one interconnecting rail (5.1) have in each case electrical connectors (20) so as to connect the conductor elements (4), wherein the electrical connectors (20) each have a depression (21) or are provided in a depression (21) of the insulating body (16) of the interconnecting ring (5.1), wherein the depression (21) is embodied so as to receive an electrically conductive joining agent and at least one conductor end of one of the conductor elements (4).

8. The stator as claimed in claim 5, wherein one or more of the current rails (18) of the one interconnecting ring (5.1) has/have cantilever sections (22) that each reach into one of the toothed sections (10) of the insulating body (16) of the interconnecting ring (5.1).

9. The stator as claimed in claim 7, wherein the electrical connectors (20) of the current rails (18) are accessible by way of an opening in the insulating body (16) of the interconnecting ring (5.1) or protrude out of the insulating body (16).

10. The stator as claimed in claim 1, wherein the joining agent is an electrically conductive adhesive, a soldering agent or a welding filler material.

11. The stator as claimed in claim 2, wherein the conductor joining devices (12) are provided in each case with two insertion slits (15) by way of which the conductor ends can be placed in the depression (14).

12. The stator as claimed in claim 6, wherein the current rails (18) of the one interconnecting rail (5.1) have in each case electrical connectors (20) so as to connect the conductor elements (4), wherein the electrical connectors (20) each have a depression (21) or are provided in a depression (21) of the insulating body (16) of the interconnecting ring (5.1), wherein the depression (21) is embodied so as to receive an electrically conductive joining agent and at least one conductor end of one of the conductor elements (4).

13. The stator as claimed in claim 6, wherein one or more of the current rails (18) of the one interconnecting ring (5.1) has/have cantilever sections (22) that each reach into one of the toothed sections (10) of the insulating body (16) of the interconnecting ring (5.1).

14. The stator as claimed in claim 7, wherein one or more of the current rails (18) of the one interconnecting ring (5.1) has/have cantilever sections (22) that each reach into one of the toothed sections (10) of the insulating body (16) of the interconnecting ring (5.1).

\* \* \* \* \*